April 24, 1951 — M. L. WHALEY — 2,550,130
TOOL FOR TWISTING WIRE LEADERS
Filed April 17, 1950 — 2 Sheets-Sheet 2
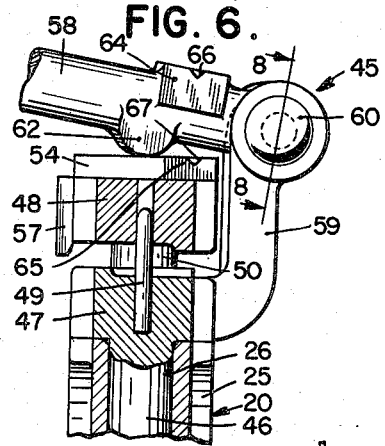
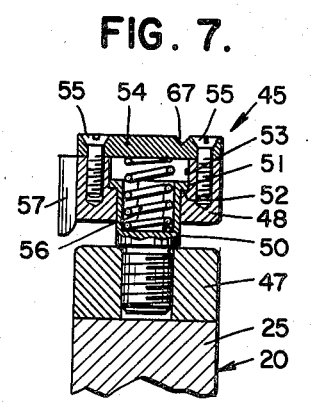
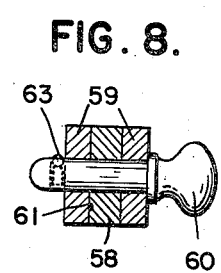
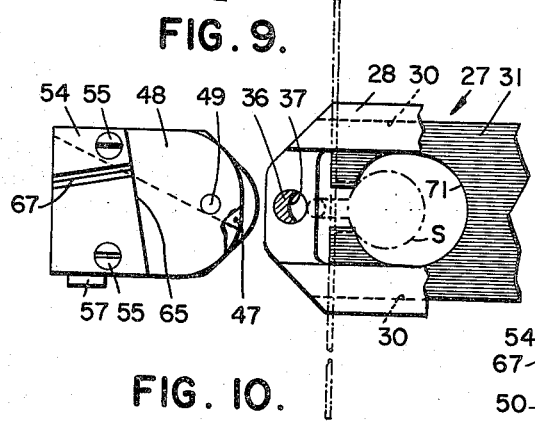
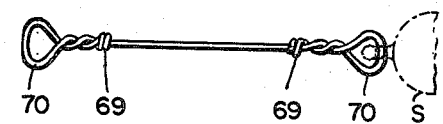
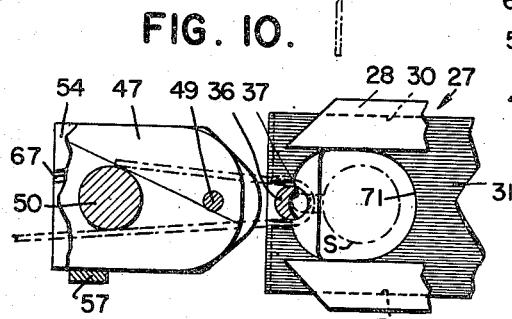
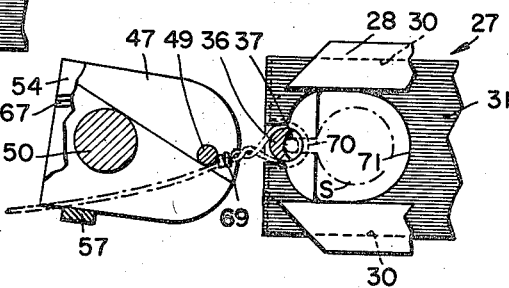
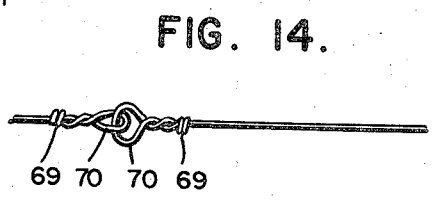
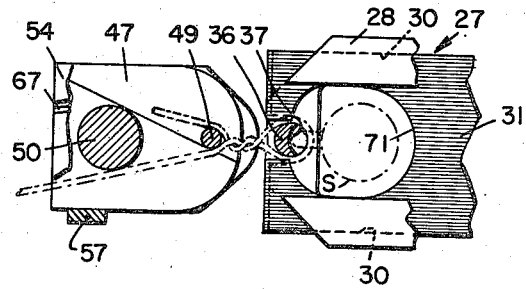
INVENTOR
MORRIS L. WHALEY
BY
ATTORNEY Patented Apr. 24, 1951

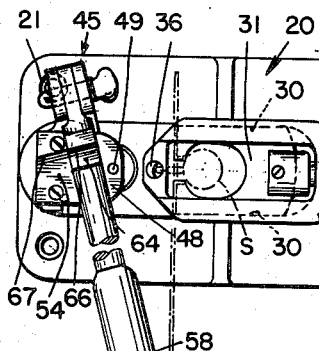
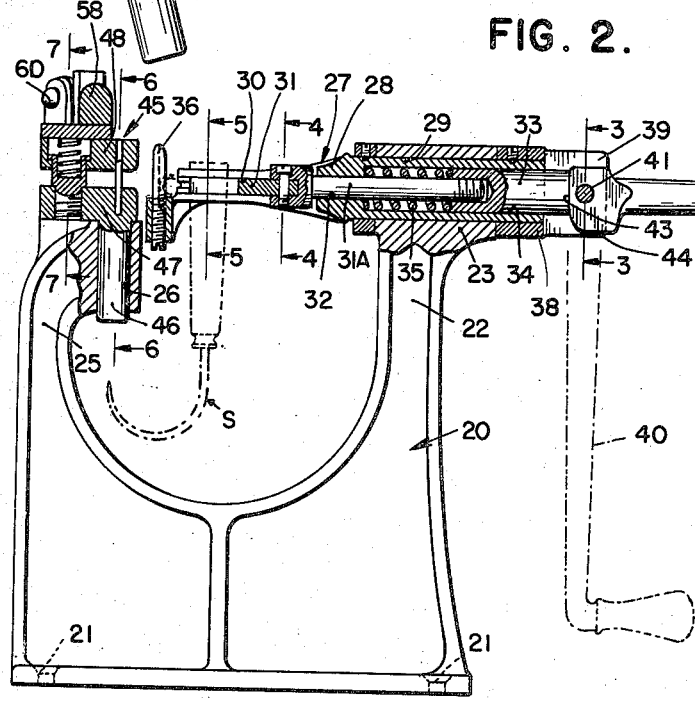
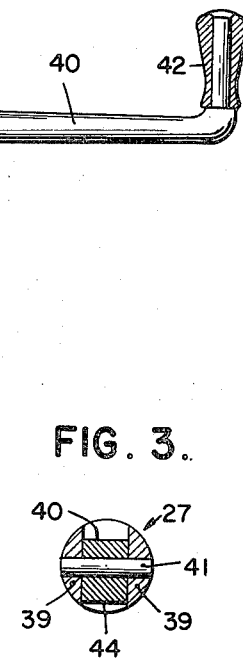
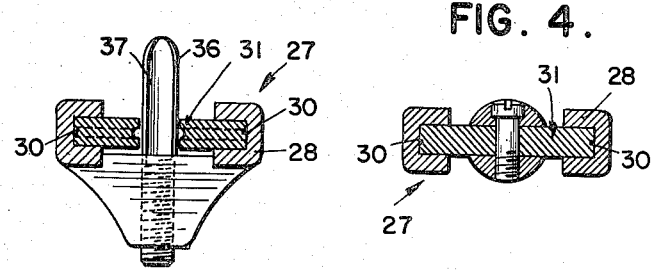

2,550,130

UNITED STATES PATENT OFFICE 2,550,130

TOOL FOR TWISTING WIRE LEADERS

Morris L. Whaley, San Diego, Calif.

Application April 17, 1950, Serial No. 156,398

6 Claims. (Cl. 140—102)

This invention relates to a hand tool for forming a loop in the end of steel wire for fishing line leaders and the like.

One object of the invention is to provide a convenient hand tool for forming connection loops in the ends of wire. Another object is to provide a hand tool for attaching a fishing hook or squid to a wire leader. A further object is to provide a hand tool for forming eyes or loops in the end of a steel wire and for interconnecting eyes or loops in adjoining wires. A further object is to provide a wire cutting tool combined with a wire twisting tool.

These and other objects are attained by my invention which will be understood from the following description, reference being made to the accompanying drawings in which:

Figure 1 is a top plan view showing a preferred form of my wire twister tool;

Figure 2 is a side elevational view partly in section of the wire twister shown in Figure 1;

Figure 3 is a cross-sectional view taken on the line 3—3 of Figure 2;

Figure 4 is a cross-sectional view taken on line 4—4 of Figure 2;

Figure 5 is a cross-sectional view taken on line 5—5 of Figure 2;

Figure 6 is an enlarged fragmentary side elevational view partly in section showing the wire clamping means;

Figure 7 is a cross-sectional view taken on the line 7—7 of Figure 2;

Figure 8 is a cross-sectional view taken on the line 8—8 of Figure 6;

Figure 9 is a schematic plan view of the loop forming and twisting member adjacent the clamping means with the steel wire positioned through the eye of the squid in the initial position for bending the wire;

Figure 10 is a view similar to Figure 9 in which the wire is shown as initially bent around the mandrel, the ends being disposed in the clamping means;

Figure 11 is a view similar to Figure 9 and Figure 10 in which the ends of the wire are shown as initially long spirally twisted to form the end loop;

Figure 12 is a schematic view somewhat similar to Figure 9, Figure 10, and Figure 11 in which the short end of the wire has been wound tightly in short spirals around the long end of the wire to complete the formation of the end loop;

Figure 13 is a side elevational view of a wire leader having loops at its two ends, one loop engaging the eye of the squid;

Figure 14 is a fragmentary view showing the interconnection of a second wire to another wire having a loop at its end, the second wire loop being formed in my device.

In commercial fishing the squid or hook is generally attached to the line by means of a steel wire leader which is provided with loops at its ends, one loop engaging the eye of the hook. It is often necessary to make quick changes of hooks or leaders or to assemble additional lines, leaders, and hooks during fishing operations and heretofore it has been customary to employ hand pliers for forming the loops in the ends of the wire. The wire however is generally of hardened steel which is not easily manipulated, as it is liable to be weakened by sharp bends and by the rough handling with pliers. In addition, it is usually necessary to waste a considerable length of wire in order to complete by hand the close-wound coils which terminates the wire twisting involved in the loop making. In addition considerable time is consumed in hand forming leaders of stiff steel wire. My invention therefore supplies a need for a portable and simple wire twisting tool which can be readily mounted on a rigid support such as a work bench and which easily performs the operation of forming loop ended wire leaders attached to each other or the eye of a hook or squid.

Referring to the drawings, my invention in its preferred form consists of a U-frame 20 which is adapted to be mounted on a rigid support by means of lag screws or bolts in the holes 21. The longer leg 22 of the U-frame 20 is provided with a horizontally disposed bearing 23. The shorter leg 25 of the U-frame 20 is provided with a vertical thrust bearing hole 26 in which a clamping means is pivoted as will be described below. A combination loop bending and twisting member 27 is mounted for turning in said horizontal bearing 23.

The loop bending and twisting member 27 consisting of an elongated forming tool support 28 which is adapted to project toward the clamping means, said support being provided with a bored hub 29 which is adapted to fit and rotate in the horizontal bearing 23, and projects beyond the bearing 23. The forming tool support 28 is provided with longitudinal grooves 30 in which a bifurcated forming tool 31 is adapted to slide, the shank end 31—A of the forming tool being mounted in the end hole 32 in the hub 29, the inner end of said tool shank being threadedly attached to the thrust rod 33 which is adapted to slide in the hole 34 of the hub 29, the end of said thrust rod 33 protruding beyond the outer end of the bearing 23. A coil spring 35 abuts the bottom of the hole 34 and also the inner end of the thrust rod 33, the spring functioning to normally keep the forming tool 31 in a retracted position. A vertical post mandrel 36 is provided at the inner end of the forming tool support 28 at a position intermediate the legs of the bifurcated forming tool 31. The mandrel is provided with a cylindrical cut-out or recess 37 on its side facing the forming tool 31, this recess being adapted to receive the eye of the hook or of a leader to which another wire loop is to be attached as will be further described. A crank handle connecting sleeve 38 is adapted to be attached to the protruding outer end of the forming tool support 28, this sleeve being provided with pivot mounting bosses 39 extending horizontally. The crank handle 40 is pivotally attached between said bosses 39 by the pivot pin 41, and is provided with a knot 42 at its outer end for turning the crank. The crank handle 40 is provided, adjacent the pivot pin, with a vertical cam surface 43 and with a connecting horizontal cam surface 44 arranged so that when the handle is bent to a position at right angles to the axis of the bearing 23 the thrust rod 33 and the attached bifurcated forming tool 31 are moved toward and astride the mandrel 36, so that a length of wire placed in the position shown particularly in Figure 9 is bent to a hairpin shape as shown in Figure 10.

Clamping means 45 is provided on the shorter leg 25 of the main U-frame 20, the thrust bearing pivot pin 46 being mounted in the vertical bearing hole 26 so that the clamping means 45 may be turned for a portion of a turn. The clamping means 45 consists of the lower clamping plate 47 which is attached to the upper end of the pivot pin 46 and an upper clamping blade 48 which is juxtaposed over the lower plate 47, being held in alignment by the guide pin 49 attached to the lower plate 47 and by the shouldered stud 50 which is threadedly mounted in the lower clamping plate 47 and is provided with a flange 51 which engages the bottom 52 of a hole 53 downward from the top surface of the upper clamping plate 48, the said hole 53 being covered or closed by the cutter plate 54 which is attached to the plate 48 by means of screws 55. A coil spring 56 is provided between the shouldered stud 50 and the under side of the cutter block 54 so that the upward movement of the upper clamping plate 48 is limited by the contact of the flange 51 with the bottom of the hole 53. The upper clamping plate is also provided with a depending lip 57 overlapping the edge of the lower plate when the plates are in clamped position whose purpose will be described later. The clamping plates are brought together in clamping position by the action of a lever arm 58 which is pivotally attached to the lug 59 extending from the lower clamp plate 47, the pivot pin 60 pivotally holding the lever arm 58 in the slot 61 at the upper end of the leg 59. The lever arm 58 is also provided with a pressing lug 62 which makes contact with the top surface of the cutter block 54. The pivot pin 60 is adapted to be easily removed, being provided with a spring detent ball 63 to hold the pivot pin removably in the holes in the lug or ears 59. The lever arm 58 is adapted to be axially turned through 180°, and remounted on the pivot pin 60 so that the shear plate 64 attached to the lever arm is positioned adjacent the cutting edge 65 of the cutter block 54 in which position the lever arm operates as a wire cutter, the wire being held in the notches 66 and 67 respectively in the shear plate 64 and the cutter block 54.

The operation of my tool has been more or less indicated in the above description. The wire to be formed into a loop may be inserted if desired through the eye of a squid or of another wire loop placed in the recess 37 of the mandrel 36 as shown in Figure 9. The crank handle 40 is bent from the axial position as shown in Figure 2 to a position at right angles thereto (as shown in broken lines) which movement causes the cam surface 44 to press against the end of the thrust rod 33 which in turn moves the notched ends of the two legs of the forming tool 31 against the wire and presses it around the mandrel 36, the ends of the wire being projected into the open clamping means 45 as shown particularly in Figure 10. The clamping means 45 is then closed by pressing down the lever arm 58, thus holding the long end of the wire between the shouldered stud 50 and the depending lip 57, the guide pin 49 being disposed between the two portions of the wire. The combined loop bending and twisting member 27 is then rotated by means of the crank arm 40 to form the open long spiral twist as shown in Figure 11, and the final close-wound coils are formed by turning the clamping means 45 at an angle as shown particularly in Figure 12 so that the guide pin 49 forces the short end of the wire to form close-wound coils 69 upon further turning of the crank arm 40. The clamp means 45 is then released, the bifurcated forming tool 31 is retracted by the movement of the crank arm 40 to the horizontal position and the wire loop or eye 70 which has been formed around the mandrel 36 together with the squid S to which it is attached is removed through the opening 71 in the forming tool support 28.

I claim:

1. A wire twister adapted for forming and connecting a loop at the end of a wire leader and the like comprising a frame having a horizontal bearing and a vertical thrust bearing disposed apart, and having means for fastening said frame to a rigid support; a loop bending and twisting member horizontally mounted on said frame, said bending and twisting member consisting of a forming tool support rotatable in said horizontal bearing, a post mandrel mounted at the free end of said support, a bifurcated forming tool adapted to move horizontally on said support to a position astride said mandrel, means to slide said tool relative to said support, and means to rotate said support, and clamping means pivotally mounted in said vertical thrust bearing on said frame, including opposed clamping members and a guide pin between said opposed clamping members adapted to space the spirals at the end of the wire being twisted in said device, said guide pin being disposed eccentrically to said pivot pin.

2. A wire twister adapted for forming and connecting a loop at the end of a wire leader and the like comprising a frame having a horizontal bearing and a vertical thrust bearing disposed apart, and having means for fastening said frame to a rigid support; a loop bending and twisting member horizontally mounted on said U-frame, said bending and twisting member consisting of a rotatable forming tool support rotatably mounted in said horizontal bearing, a post mandrel mounted at the free end of said support, a bifurcated forming tool adapted to move horizontally on said support to a position astride said mandrel, means to slide said tool relative to said support, a spring means operatively connected between said tool and said support and adapted to normally hold said forming tool away from said mandrel, a crank arm operatively attached to said support and adapted to rotate said support while said forming tool is astride said mandrel; and clamping means pivotally mounted in said vertical thrust bearing on said frame opposite said forming tool, said clamping means consisting of a lower clamp plate, an upper clamp plate, means to press said clamp plates together, and a guide pin between said clamp plates adapted to space the spirals at the end of the wire being twisted in said device, said guide pin being eccentrically disposed relative to the axis of turning of said clamping means.

3. A wire twister adapted for forming and connecting a loop at the end of wire leader and the like comprising a U-frame having a horizontal bearing on one leg and a vertical thrust bearing on the other leg, and having means for fastening said frame to a rigid support; a combined loop bending and twisting member horizontally mounted on said U-frame, said bending and twisting member consisting of a rotatable forming tool support having horizontal opposed slides at one end, the other end being a cylinder rotatable in said horizontal bearing, a vertical cylindrical mandrel mounted at the end of said support between said slides, a bifurcated forming tool having cooperating slides and adapted to move horizontally in said slides to a position astride said mandrel, means to slide said tool relative to said support spring means operatively connected between said tool and said support and adapted to normally hold said forming tool away from said mandrel, a crank arm operatively attached to said support and adapted to rotate said support while said forming tool is astride said mandrel; and clamping means pivotally mounted in said vertical thrust bearing on said frame, said clamping means consisting of a vertically disposed pivot pin, a lower clamp plate mounted on the upper end of said pivot pin, an upper clamp plate, means for pressing said plates together, and a guide pin between said plates adapted to space the spirals at the end of the wire being held and twisted in said device, said guide pin being disposed eccentrically to said pivot pin.

4. A wire twister adapted for forming and connecting a loop at the end of wire leader and the like comprising a U-frame having a horizontal bearing on one leg and a vertical thrust bearing on the other leg, and having means for fastening said frame to a rigid support; a combined loop bending and twisting member horizontally mounted on said U-frame, said bending and twisting member consisting of a rotatable forming tool support having horizontal opposed slides at one end, the other end being a bored cylinder rotatable in said horizontal bearing, a vertical cylindrical mandrel mounted at the end of said support between said slides, a bifurcated forming tool having cooperating slides and adapter to move horizontally in said slides to a position astride said mandrel, said forming tool having a stem slidably mounted in an axial hole in the cylindrical end of said support, a thrust rod in the bored end of said support, said rod being attached to said stem, spring means operatively connected between said thrust rod and said support and adapted to normally hold said forming tool away from said mandrel, a crank arm operatively attached to said cylindrical portion of said support, and adapted to rotate said support while said forming tool is astride said mandrel, means associated with said crank arm whereby said thrust rod and attached forming tool may be projected toward said mandrel; and clamping means pivotally mounted in said vertical thrust bearing on said frame, said clamping means consisting of a vertically disposed pivot pin, a lower clamp plate mounted on the upper end of said pivot pin, an upper clamp plate movable relative to said lower clamp plate, means for pressing said plates together, and a guide pin between said plates adapted to space the spirals at the end of the wire being held and twisted in said device, said guide pin being disposed eccentrically to said pivot pin.

5. A wire twister adapted for forming and connecting a loop at the end of wire leader and the like comprising a U-frame having a horizontal bearing on one leg and a vertical thrust bearing on the other leg, and having means for fastening said frame to a rigid support; a combined loop bending and twisting member horizontally mounted on said U-frame, said bending and twisting member consisting of a rotatable forming tool support having horizontal opposed slides at one end, the other end being a bored cylinder rotatable in said horizontal bearing, a vertical cylindrical mandrel mounted at the end of said support between said slides, a bifurcated forming tool having cooperating slides and adapter to move horizontally in said slides to a position astride said mandrel, said forming tool having a stem slidably mounted in an axial hole in the cylindrical end of said support, a thrust rod in the bored end of said support, said rod being attached to said stem, spring means operatively connected between said thrust rod and said support and adapted to normally hold said forming tool away from said mandrel, a crank arm operatively attached to said cylindrical portion of said support, and adapted to rotate said support while said forming tool is astride said mandrel, means associated with said crank arm whereby said thrust rod and attached forming tool may be projected toward said mandrel; and clamping means pivotally mounted in said vertical thrust bearing on said U-frame, said clamping means consisting of a vertically disposed pivot pin, a lower clamp plate mounted on the upper end of said pivot pin, a movable upper clamp plate, spring means acting to normally hold said plates apart, a lever arm pivotally attached to said lower plate and pressing upon said upper plate as a fulcrum, and a guide pin between said plates adapted to space the spirals at the end of the wire being held and twisted in said device, said guide pin being disposed eccentrically to said pivot pin.

6. A wire twister adapted for forming and connecting a loop at the end of wire leader and the like comprising a U-frame having a horizontal bearing on one leg and a vertical thrust bearing on the other leg, and having means for fastening said frame to a rigid support; a combined loop bending and twisting member horizontally mounted on said U-frame, said bending and twisting member consisting of a rotatable forming tool support having horizontal opposed slides at one end, the other end being a bored cylinder rotatable in said horizontal bearing, a vertical cylindrical mandrel mounted at the end of said support between said slides, said mandrel having a cylindrical recess on the side thereof facing said horizontal bearing, a bifurcated forming tool having cooperating slides and adapter to move horizontally astride said mandrel, said forming tool having a stem slidably mounted in an axial hole in the cylindrical end of said support, a thrust rod in the bored end of said support, said rod being attached to said stem, spring means operatively connected between said thrust rod and said support and adapted to normally hold said forming tool away from said mandrel, a crank arm operatively attached to said cylindrical portion of said support, said crank arm being pivotally mounted and being provided with cam surfaces abutting the free end of said thrust rod, whereby said thrust rod and attached forming tool are projected toward said mandrel when said horizontally disposed crank arm is bent to cranking position at right angles to the axis of said bearing; and clamping means pivotally mounted in said vertical thrust bearing on said U-frame, said clamping means consisting of a vertically disposed pivot pin, a lower clamp plate mounted on the upper end of said pivot pin, an upper clamp plate, a spring shoulder stud mounted on said lower clamp plate and engaging said upper plate to limit its upward movement, spring means acting to normally hold said plates apart, a lever arm pivotally attached to said lower plate and pressing upon said upper plate as a fulcrum, said upper plate being provided with an overhanging lip adapted to laterally hold a wire being twisted in said clamping means, and a guide pin between said plates adapted to spare the spirals at the end of the wire being twisted in said device, said guide pin being disposed eccentrically to said pivot pin.

MORRIS L. WHALEY.

REFERENCES CITED

The following references are of record in the file of this patent:

UNITED STATES PATENTS

| Number | Name | Date |
|---|---|---|
| 1,163,902 | Emery | Dec. 14, 1915 |
| 1,400,937 | Bull | Dec. 20, 1921 |
| 2,481,587 | Gregory | Sept. 13, 1949 |